US011146938B2

(12) United States Patent
Farley

(10) Patent No.: US 11,146,938 B2
(45) Date of Patent: Oct. 12, 2021

(54) FIRST RESPONDER READINESS SYSTEM

(71) Applicant: Scott Technologies, Inc., Monroe, NC (US)

(72) Inventor: Daniel G. Farley, Westminster, MA (US)

(73) Assignee: Scott Technologies, Inc., Monroe, NC (US)

( * ) Notice: Subject to any disclaimer, the term of this patent is extended or adjusted under 35 U.S.C. 154(b) by 0 days.

(21) Appl. No.: 16/088,130

(22) PCT Filed: Apr. 7, 2017

(86) PCT No.: PCT/US2017/026549
§ 371 (c)(1),
(2) Date: Sep. 25, 2018

(87) PCT Pub. No.: WO2017/177106
PCT Pub. Date: Oct. 12, 2017

(65) Prior Publication Data
US 2020/0322772 A1 Oct. 8, 2020

Related U.S. Application Data

(60) Provisional application No. 62/319,448, filed on Apr. 7, 2016.

(51) Int. Cl.
*H04W 4/90* (2018.01)
*G08B 29/02* (2006.01)
(Continued)

(52) U.S. Cl.
CPC .............. *H04W 4/90* (2018.02); *G08B 29/02* (2013.01); *H04W 36/32* (2013.01); *H04W 52/0261* (2013.01)

(58) Field of Classification Search
CPC ... H04W 4/90; H04W 36/32; H04W 52/0261; G08B 29/02; A62B 9/006
See application file for complete search history.

(56) References Cited

U.S. PATENT DOCUMENTS 5,912,546 A 6/1999 Sakou
6,899,101 B2 5/2005 Haston
(Continued)

FOREIGN PATENT DOCUMENTS

TW 201530506 8/2015

OTHER PUBLICATIONS

International Search Report for PCT International Application No. PCT/US2017/026549, dated Jul. 27, 2017, 4 pages.

*Primary Examiner* — Barry W Taylor

(57) ABSTRACT

A first responder readiness data server for monitoring at least one readiness parameter of a monitorable device obtainable from a sensor couplable to the monitorable device, the sensor configured to detect a present value of the at least one readiness parameter of the monitorable device. The server includes a communication interface configured to receive data transmitted from the sensor, the data corresponding to the present value of at least one readiness parameter of the monitorable device, and a processor configured to determine if the present value of the at least one readiness parameter of the monitorable device meets at least one user-defined rule, determine a device status indicating if the present value of the at least one readiness parameter of the monitorable device has met the user-defined rule, the communication interface further configured to transmit an indication of the device status to a monitoring display.

20 Claims, 7 Drawing Sheets

(51) Int. Cl.
*H04W 36/32* (2009.01)
*H04W 52/02* (2009.01)

(56) References Cited

U.S. PATENT DOCUMENTS

| | | | |
|---|---|---|---|
| 8,614,745 B1 | 12/2013 | Al Azemi | |
| 8,854,194 B2 | 10/2014 | McSheffrey | |
| 2008/0319666 A1* | 12/2008 | Petrov | G01C 21/005 |
| | | | 701/469 |
| 2010/0081411 A1* | 4/2010 | Montenero | G08B 21/0233 |
| | | | 455/404.2 |
| 2013/0053063 A1 | 2/2013 | McSheffrey | |
| 2013/0298652 A1* | 11/2013 | Gillette, II | B65D 25/38 |
| | | | 73/114.01 |
| 2015/0066557 A1* | 3/2015 | Lichti | G08G 1/20 |
| | | | 705/7.15 |
| 2015/0097664 A1 | 4/2015 | Breed | |
| 2016/0080888 A1* | 3/2016 | Kreitzer | G06F 3/017 |
| | | | 455/39 |
| 2016/0304051 A1* | 10/2016 | Archer | G07C 5/0825 |
| 2017/0251933 A1* | 9/2017 | Braun | A61B 5/02055 |
| 2018/0293818 A1* | 10/2018 | Linsmeier | G06Q 50/28 |

\* cited by examiner

FIRST RESPONDER READINESS SYSTEM

CROSS REFERENCE TO RELATED APPLICATIONS

This application is a national stage filing under 35 U.S.C. 371 of PCT/US2017/026549, filed Apr. 7, 2017, which claims the benefit of U.S. Provisional Patent Application No. 62/319,448, filed Apr. 7, 2016, the disclosures of which are incorporated by reference in their entirety herein.

TECHNICAL FIELD

The present disclosure relates to a device readiness monitoring system. More particularly, the disclosure relates to a device readiness monitoring system for monitoring readiness values of devices which are essential to the operation of emergency, i.e., first responder, services such as fire or police. The device readiness monitoring system allows for the remote monitoring of important device characteristics such as battery charge level, fuel level, water level, air pressure level, temperature, and the like. These device characteristics may be monitored remotely via a wireless data network or the like.

BACKGROUND

Emergency personnel rely on various types of equipment in responding to and managing disasters and emergencies. To ensure that all necessary emergency equipment is operable and ready for use, the equipment must be recharged, refilled, or otherwise returned to a ready state upon return from an emergency incident or training session. Such emergency equipment must also be periodically inspected to make sure that it is capable of maintaining a ready state for emergency response purposes.

The frequency of inspections may vary based on several factors, including personnel availability. Sometimes equipment may fail between inspections. Batteries die, water levels leak and air pressure drops. If an emergency occurs while equipment is off-line or not in a constant ready state, the results can range from being merely inconvenient to highly catastrophic for emergency, i.e., first responder, personnel. For example, if a fire department arrived at a station ready to respond to an emergency and discovered a dead battery in one of the fire vehicles, a delayed response to the emergency could be catastrophic.

Several methods are known for monitoring the ready state of certain devices. For instance, many devices having internal rechargeable batteries are charged on a housing or base having a light-emitting diode (LED) light which indicates whether the device is fully charged. One example of this is provided by U.S. Pat. No. 5,912,546, which discloses a battery charging base for a power drill. The charging base has an LED light which indicates a charging condition of a battery pack installed in the charger. Other devices such as self-contained breathing apparatus (SCBA) devices include warning displays which reflect remaining air levels in the system. U.S. Pat. No. 6,899,101 provides an SCBA regulator having a display mounted thereon, with an exterior warning light to indicate the pressure level of breathing gas. While such warning levels and displays are useful and often accurate, in an environment such as a fire station when dozens of devices and pieces of equipment must be continuously monitored, a streamlined solution is needed where the status of such a plurality of devices may be monitored in a single location.

U.S. Pat. No. 8,854,194 provides a method for remotely monitoring certain devices that requires the presence of image sensors or cameras for the external visual viewing of existing measurement devices, such as pre-existing gauges or thermometers. Particularly, their system teaches taking photographs of fire extinguisher gauges and a reporting the photographed findings to an operator. However, this method only allows a user to visually check sensor statuses on the individual devices and does not report the status values of multiple devices to a single monitored location.

SUMMARY

The disclosed device monitoring system serves to continuously monitor vital readiness values and parameters of various monitorable devices and equipment, while providing a convenient means for users such as emergency personnel to access and view these device values via on-site displays and remote mobile device displays. The system utilizes low-cost wireless sensors coupled to certain monitorable devices, which sensors are configured to detect a present value of certain pre-selected parameters of the devices. The sensors then relay this information to a data server which processes information relating to the pre-selected parameters. A rules engine of the data server determines whether the data received from the wireless sensors meets certain user-defined rules regarding these pre-selected parameters, and the data is thus formulated into a device readiness report. The readiness statuses of devices or equipment are made available on a monitoring display such as a monitor at a fire station, as well as via remote monitoring displays such as a fire commander's wireless mobile device. Such mobile devices may access the disclosed system using various means, such as via an iOS or ANDROID or WINDOWS device application (app), a secure web portal or dashboard, or the like. The monitoring displays may indicate which equipment is in a ready state, which has left a ready state, and optionally those which are on the verge of falling out of a ready state, depending on how the system is programmed. The disclosed device monitoring system allows for such monitoring displays to advantageously be viewed at any time, from virtually anywhere, to provide remote and continuous monitoring of device readiness statuses.

In contrast to U.S. Pat. No. 8,854,194, the present disclosure provides a system wherein wireless sensors are coupled to the monitorable devices themselves, which sensors directly detect and report certain pre-selected parameters of these devices. As an example, the presently disclosed wireless sensors are coupled to a battery or the like, such that they are configured to directly detect and monitor a battery charge level of, for example, the battery of a first responder Fire Apparatus (i.e., fire truck, fire engine, etc.), or radio battery, etc., rather than simply providing a camera which takes a photo of an existing battery gauge from an external position. Thus, the present system which utilizes wireless sensors directly coupled to said monitorable devices, allows for highly accurate real-time monitoring of such devices.

The present system further serves to provide real-time notifications in the form of audio and/or visual warnings and alerts for such monitorable devices and equipment, such as when the equipment leaves its ready state in between uses and/or inspections. Email, text, and/or SMS alerts may be sent to warn selected personnel when monitored equipment has left its ready state.

In one aspect of the disclosure, a first responder readiness data server for monitoring at least one readiness parameter of a monitorable device obtainable from at least one sensor couplable to the monitorable device, the at least one sensor configured to detect a present value of the at least one readiness parameter of the monitorable device, is provided. The server includes a communication interface configured to receive data transmitted from the at least one sensor, the data corresponding to the present value of the at least one readiness parameter of the monitorable device, and processing circuitry including a memory and a processor, the memory in communication with the processor, the memory having instructions that, when executed by the processor, configure the processor to determine if the present value of the at least one readiness parameter of the monitorable device meets at least one user-defined rule and determine a device status indicating if the present value of the at least one readiness parameter of the monitorable device has met the at least one user-defined rule. The communication interface is further configured to transmit an indication of the device status to a monitoring display.

In one embodiment of this aspect, the at least one sensor is configured to detect a change in the present value of the at least one readiness parameter of the monitorable device as compared to a previously detected value. In another embodiment, the communication interface is further configured to receive an indication from the at least one sensor that the present value of the at least one readiness parameter has changed as compared to a previously detected value, and the processor is further configured to generate an alert based on the received indication, the alert indicating at least one of the at least one user-defined rule has been met, the at least one readiness parameter has fallen below a desired level, the monitorable device is in a ready state for emergency response purposes, the monitorable device has left the ready state, and the monitorable device is about to fall out of the ready state.

In another embodiment, the monitoring display is one of a personal computer, a laptop, and a wireless mobile device. In another embodiment, the first responder readiness data server is remotely accessible via a wireless network. In another embodiment, the first responder readiness data server is remotely accessible via one of a secure web portal and mobile device application. In another embodiment, the first responder readiness data server is a cloud-based data server.

In another embodiment, the readiness parameter is one of oxygen level, air pressure level, battery charge level, battery voltage level, battery life remaining, landline connection, network connection, fuel level, water level, and temperature level. In another embodiment, the monitorable device is one of an air pack, a gas mask, a self-contained breathing apparatus (SCBA) tank, a battery, and a fuel tank. In another embodiment, the data corresponding to the present value of the at least one readiness parameter of the monitorable device is received from a gateway apparatus, the gateway apparatus receiving the data from the at least one sensor.

According to another aspect of the disclosure, a first responder readiness data server for monitoring at least one readiness parameter of a monitorable device obtainable from a plurality of sensors couplable to the monitorable device, the plurality of sensors each configured to detect a present value of the at least one readiness parameter of a corresponding monitorable device, is provided. The server includes a communication interface configured to receive data transmitted from the plurality sensors, the data corresponding to the present value of the at least one readiness parameter for each of the plurality of monitorable devices, and processing circuitry including a memory and a processor, the memory in communication with the processor, the memory having instructions that, when executed by the processor, configure the processor to determine that the present value of the at least one readiness parameter of at least one of the plurality of monitorable devices has changed as compared to a previously detected value, determine that the changed present value of the at least one readiness parameter meets at least one user-defined rule, and generate an alert, the alert indicating at least one of the at least one user-defined rule has been met by the changed present value of the at least one readiness parameter, the changed present value of the at least one readiness parameter has fallen below a desired level, the at least one of the plurality of monitorable devices corresponding to the changed present value of the at least one readiness parameter is in a ready state for emergency response purposes, the at least one of the plurality of monitorable devices corresponding to the changed present value of the at least one readiness parameter has left the ready state, and the at least one of the plurality of monitorable devices corresponding to the changed present value of the at least one readiness parameter is about to fall out of the ready state.

In another aspect of the present disclosure, a method, in a first responder readiness data server, for monitoring at least one readiness parameter of a monitorable device obtainable from at least one sensor couplable to a monitorable device, the at least one sensor configured to detect a present value of the at least one readiness parameter of the monitorable device, is provided. The method includes receiving data transmitted from the at least one sensor, the data corresponding to the present value of the at least one readiness parameter of the monitorable device, determining if the present value of the at least one readiness parameter of the monitorable device meets at least one user-defined rule, determining a device status indicating if the present value of the at least one readiness parameter of the monitorable device has met the at least one user-defined rule, and transmitting an indication of the device status to a monitoring display.

According to an embodiment of this aspect, the at least one sensor is configured to detect a change in the present value of the at least one readiness parameter of the monitorable device as compared to a previously detected value. In another embodiment, the method further includes receiving an indication from the at least one sensor that the present value of the at least one readiness parameter has changed as compared to a previously detected value, and generating an alert based on the received indication, the alert indicating at least one of the at least one user-defined rule has been met, the at least one readiness parameter has fallen below a desired level, the monitorable device is in a ready state for emergency response purposes, the monitorable device has left the ready state, and the monitorable device is about to fall out of the ready state.

In another embodiment, the monitoring display is one of a personal computer, a laptop, and a wireless mobile device. In another embodiment, the first responder data server is remotely accessible via a wireless network. In another embodiment, the first responder data server is remotely accessible via one of a secure web portal and mobile device application. In another embodiment, the first responder data server is a cloud-based data server. In another embodiment, the readiness parameter is one of oxygen level, air pressure level, battery charge level, battery voltage level, battery life remaining, landline connection, network connection, fuel level, water level, and temperature level. In another embodiment, the monitorable device is one of an air pack, a gas mask, a self-contained breathing apparatus (SCBA) tank, a battery, and a fuel tank.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
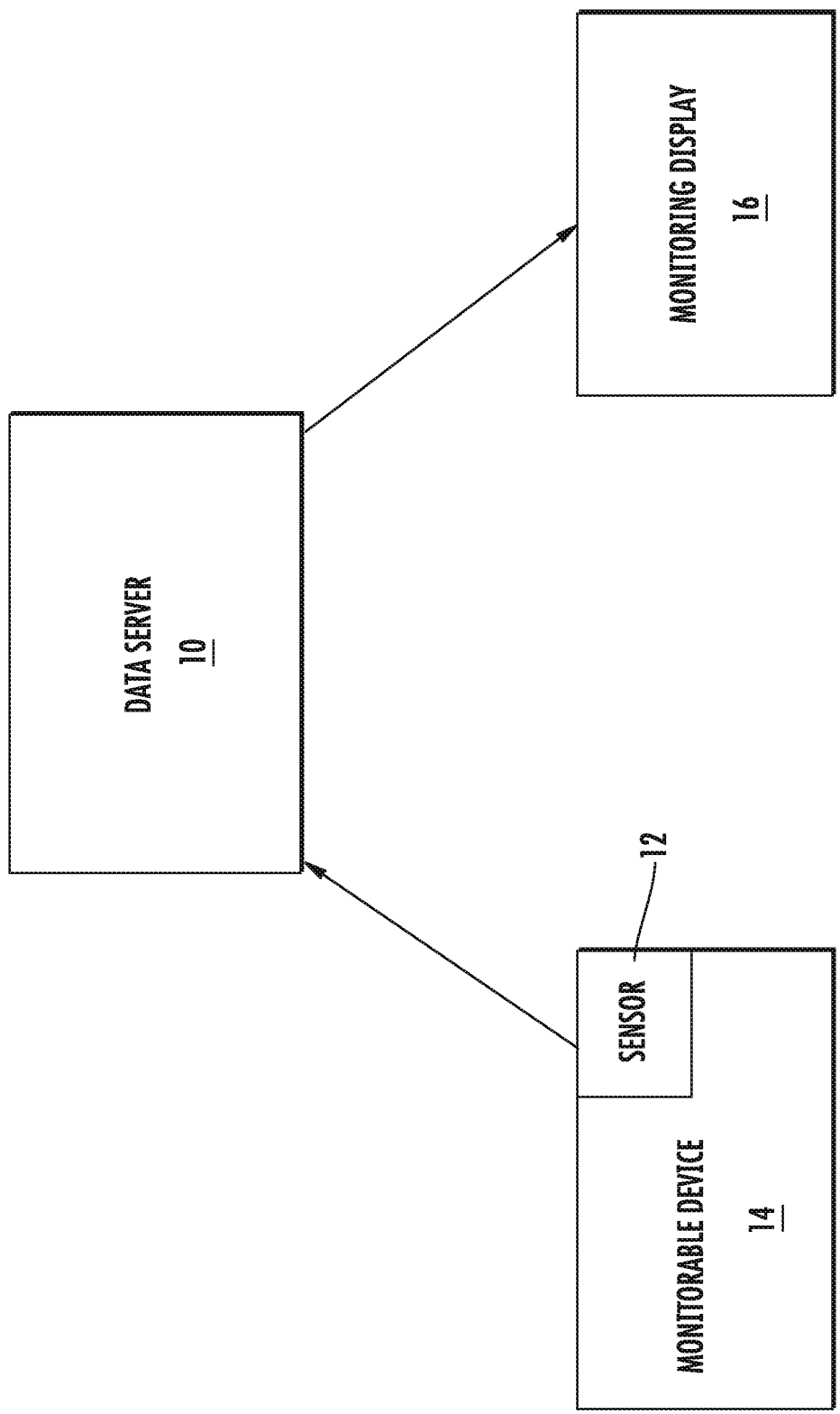
FIG. 1 is a block diagram of the system components according to one embodiment of the disclosure.

Before describing in detail exemplary embodiments, it is noted that the embodiments reside primarily in combinations of apparatus components and processing steps related to monitoring at least one readiness parameter of a monitorable device. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The present disclosure provides a device monitoring system which is configured to monitor a variety of devices and pieces of equipment, including emergency equipment and the like. The types of devices and equipment to be monitored may vary depending on differing circumstances, parameters, and environments such as emergency type, station type, personnel type, geographic location and terrain, among others. Types of devices and equipment can be determined by those in a supervisory position, or on the basis of need.

The device monitoring system according to the present disclosure may comprise a multitude of components. Referring now to the drawing figures in which like reference designators refer to like elements, in an example embodiment as depicted in FIG. 1, the device monitoring system includes a data center 10, and at least one sensor 12 coupled to at least one monitorable device 14. Sensor 12 is in communication with data center 10, and this communication could be via a wired or a wireless connection. Although only one sensor 12 and one monitorable device 14 are shown in FIG. 1, it is within the scope of the present disclosure to have a system that includes multiple sensors 12 each monitoring a corresponding monitorable device 14. Sensor 12 may be integral with the monitorable device 14, or may be attached or otherwise connected to the monitorable device 14. Sensor 12 is preferably configured to detect a present value of at least one pre-selected parameter of the monitorable device 14. Examples of such parameters and values are described in detail below. Sensor 12 is preferably further arranged to detect a change in the present value of the pre-selected parameter of monitorable device 14 as compared to a previously detected value. Sensor 12 may include a wireless transmitter and/or transceiver. Sensor 12 is configured to generate data transmissions corresponding to the present value of the pre-selected parameter of monitorable device 14, or corresponding to a detected change in value of the pre-selected parameter of monitorable device 14 as compared to a previously detected value, to other components of the device monitoring system. In certain embodiments, sensor 12 is configured to receive wireless data transmissions from other wireless-enabled components of the device monitoring system.

Figure 3:
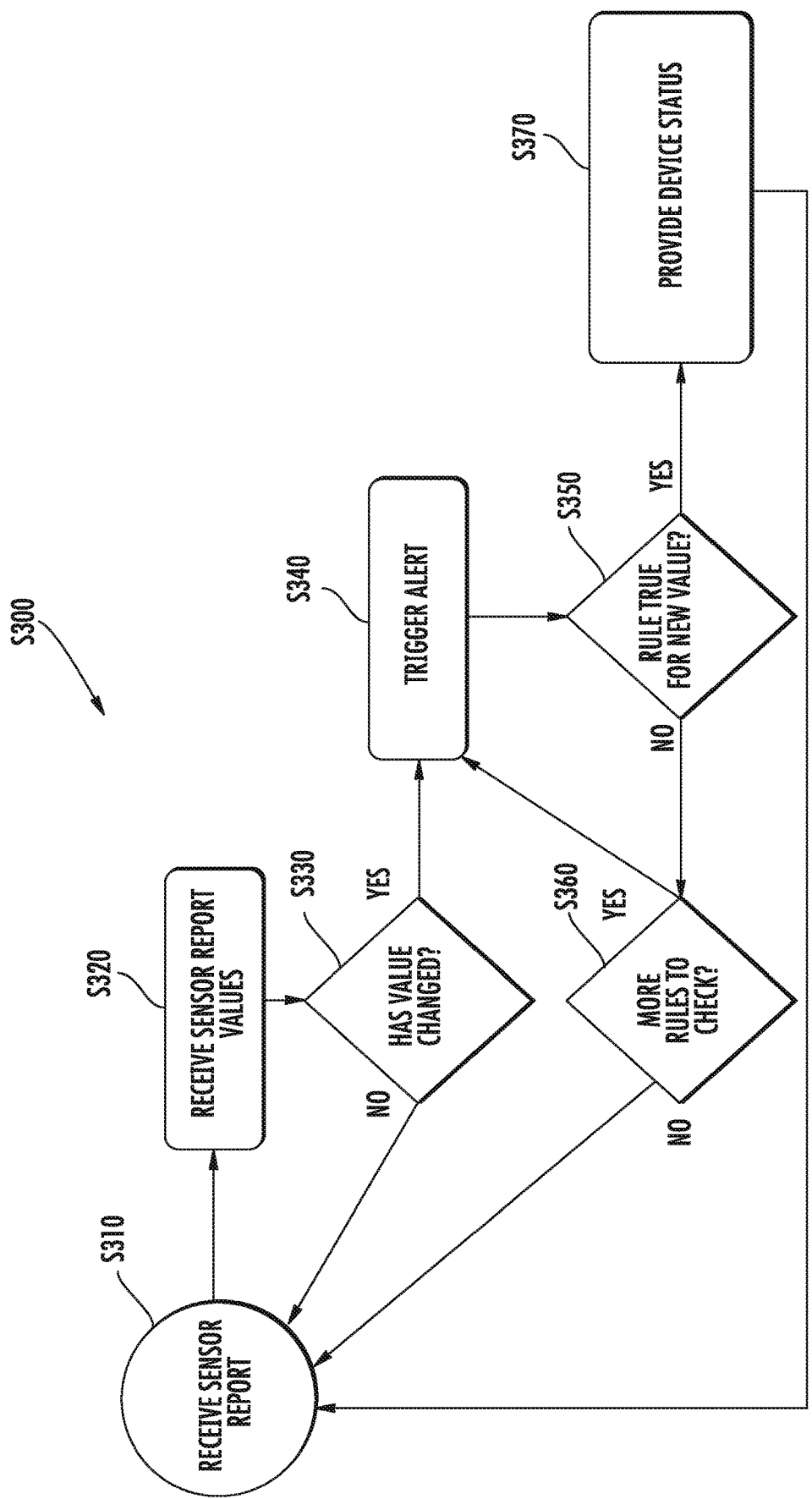
FIG. 3 is a flow chart of an exemplary process for monitoring at least one readiness parameter of a monitorable device according to one embodiment of the disclosure.

In certain embodiments, for example as depicted in FIG. 3, the device monitoring system includes a plurality of readiness sensors 12, each being capable of detecting the present value of a pre-selected parameter of a corresponding monitorable device 14. In certain embodiments, the device monitoring system may include a plurality of readiness sensors 12, each being capable of detecting the present value of multiple pre-selected parameters of a corresponding monitorable device 14, whether simultaneously or individually. In certain embodiments, the device monitoring system includes a plurality of wireless readiness sensors 12, each being capable of detecting the present value of multiple pre-selected parameters of multiple monitorable devices 14, whether simultaneously or individually.

Monitorable device 14 may be any electronic or non-electronic device or any suitable piece of equipment to be monitored. Nonexclusive examples of such monitorable devices include emergency devices and/or emergency equipment such as air packs, air tanks, gas masks, self-contained breathing apparatus (SCBA) tanks, chargeable or non-chargeable device batteries including but not limited to radio batteries, vehicle batteries (such as the batteries of first responder vehicles, such as fire engines or fire trucks), vehicle fuel tanks, equipment fuel tanks, apparatus water tanks, and vehicle water tanks, among others. The monitorable device 14 may also include a non-electronic piece of equipment such as an axe or ladder, wherein the presence or absence of the device is detected via a bracket which is coupled to sensor 12. Such parameters may be monitored and corresponding status levels reported, as described below. Certain monitorable devices may include proprietary TYCO® and/or SCOTT SAFETY® products, including but not limited to SCOTT Airpacks, TYCO® On Edge Connect radios and devices, and the like. SCOTT SAFETY®, a business unit of TYCO® International, is a manufacturer of protective equipment and safety devices for firefighters, police, industrial workers, militaries, homeland security forces, and emergency/rescue personnel around the world. The present disclosure allows for the ability to use SCOTT SAFETY® devices for efficacy. Certain battery operated remote SCOTT SAFETY® devices are designed to accumulate and report data on pieces of equipment to be monitored. The disclosed device monitoring system further has the flexibility to utilize TWAIN compatible scanners. TWAIN is known in the art as an applications programming interface (API) and communications protocol which regulates communication between software and digital imaging devices, such as scanners.

Parameters to be monitored by the disclosed device monitoring system are based on the type of device to be monitored, and nonexclusively include oxygen level, air pressure level, battery charge/voltage level, battery life remaining, landline connection, network connection, fuel level, water level, temperature level, among other parameters. The appropriate unit values of these parameters to be monitored may be determined by those skilled in the art. For instance, air pressure values may be detected in units of pound-force per square inch (psi), or even Pascals (Pa), while fuel levels may be detected in units of fluid ounces, and temperature may be detected in degrees Celsius or Fahrenheit.

FIG. 1 shows device monitoring system that includes data server 10, which is capable of communication either wired or wireless, with at least one sensor 12. In certain embodiments of this disclosure, data server 10 is a cloud-based data server. Data server 10 may be remotely accessed by a variety of means, such as a wireless network, cellular network, a secure web portal, a mobile device application, or the like.

Figure 2:
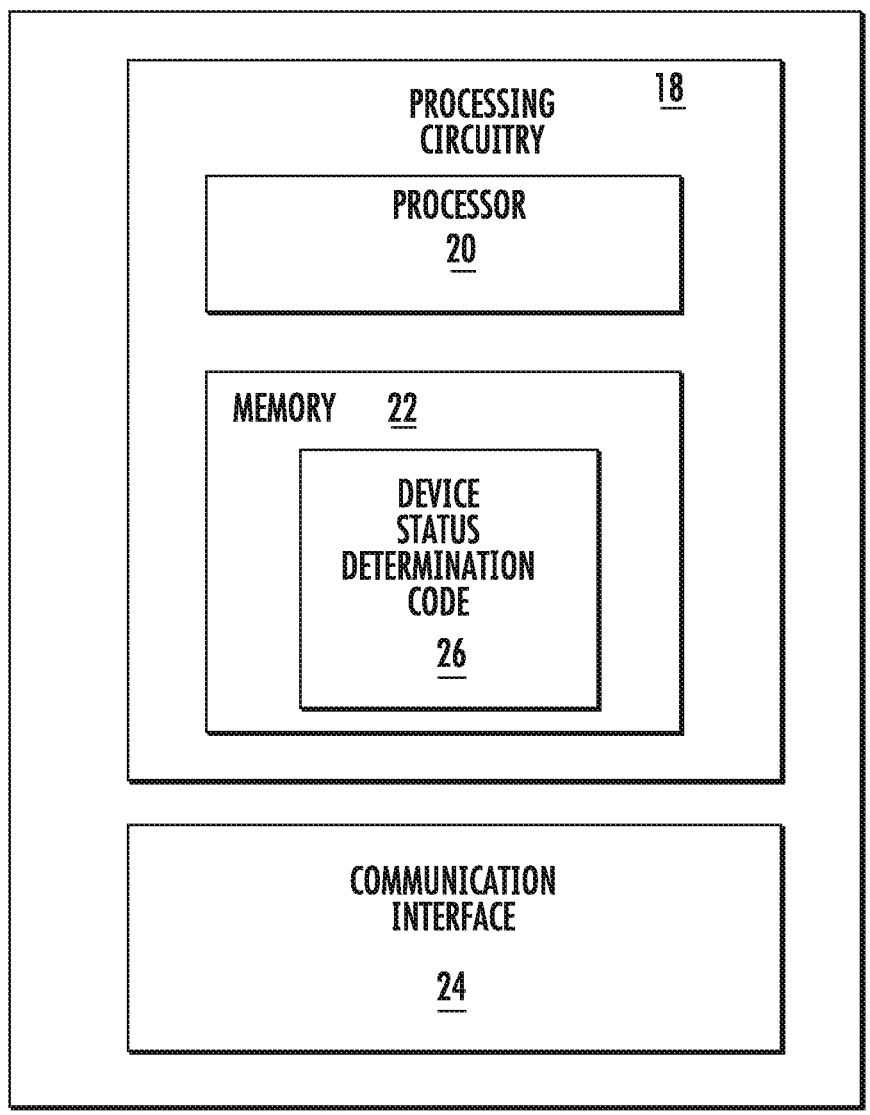
FIG. 2 is a block diagram of the data server and the components therein according to one embodiment of the disclosure.

FIG. 2 is a block diagram showing, in one embodiment, exemplary components of data server 10. Data server 10 includes processing circuitry 18, which includes processor 20 and memory 22, where memory 22 may store device status determination code 26, and communication interface 24. Communication interface 24 may include a wireless transmitter and/or transceiver.

In addition to a traditional processor and memory, processing circuitry 18 may comprise integrated circuitry for processing and/or control, e.g., one or more processors and/or processor cores and/or FPGAs (Field Programmable Gate Array) and/or ASICs (Application Specific Integrated Circuitry). Processor 20, which controls the operation of data server 10, may be configured to access (e.g., write to and/or read from) memory 22, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 22 may be configured to store code executable by processor 20 and/or other data, e.g., data pertaining to communication, e.g., configuration and/or address data of nodes, etc. Memory 22 has instructions that, when executed by processor 20, configures processor 20 to perform the processes performed by data server 10 described herein. Data server 10 may include additional components not shown in FIG. 2.

Communication interface 24 of data server 10 is configured to receive data transmitted from sensor 12 and/or from other components of the device monitoring system. In certain embodiments, communication interface 24 of data server 10 is configured to transmit data to sensor and/or to other components of the device monitoring system. In one embodiment, the communication between data server 10 and sensor 12 and/or other components of the device monitoring system are wireless transmissions. Wireless transmissions between various wireless-enabled components of the disclosed device monitoring system can be achieved using any suitable conventional wireless systems, networks, and/or protocol. Examples of such wireless systems may include Bluetooth® networks, cellular networks, wireless local area networks (wLAN), Zigbee® networks, TycoNet™ networks, and/or any other suitable means of wireless communication between devices. The Internet of Things (IoT) is known in the art as the network of physical objects or "things" embedded with electronics, software, sensors, and network connectivity, which enables these objects to collect and exchange data across existing network infrastructure. Thus, one skilled in the art would clearly and readily ascertain how the presently disclosed data server 10 would be capable of wirelessly communicating with at least one wireless sensor 12, among other wireless-enabled components of the device monitoring system.

Figure 5:
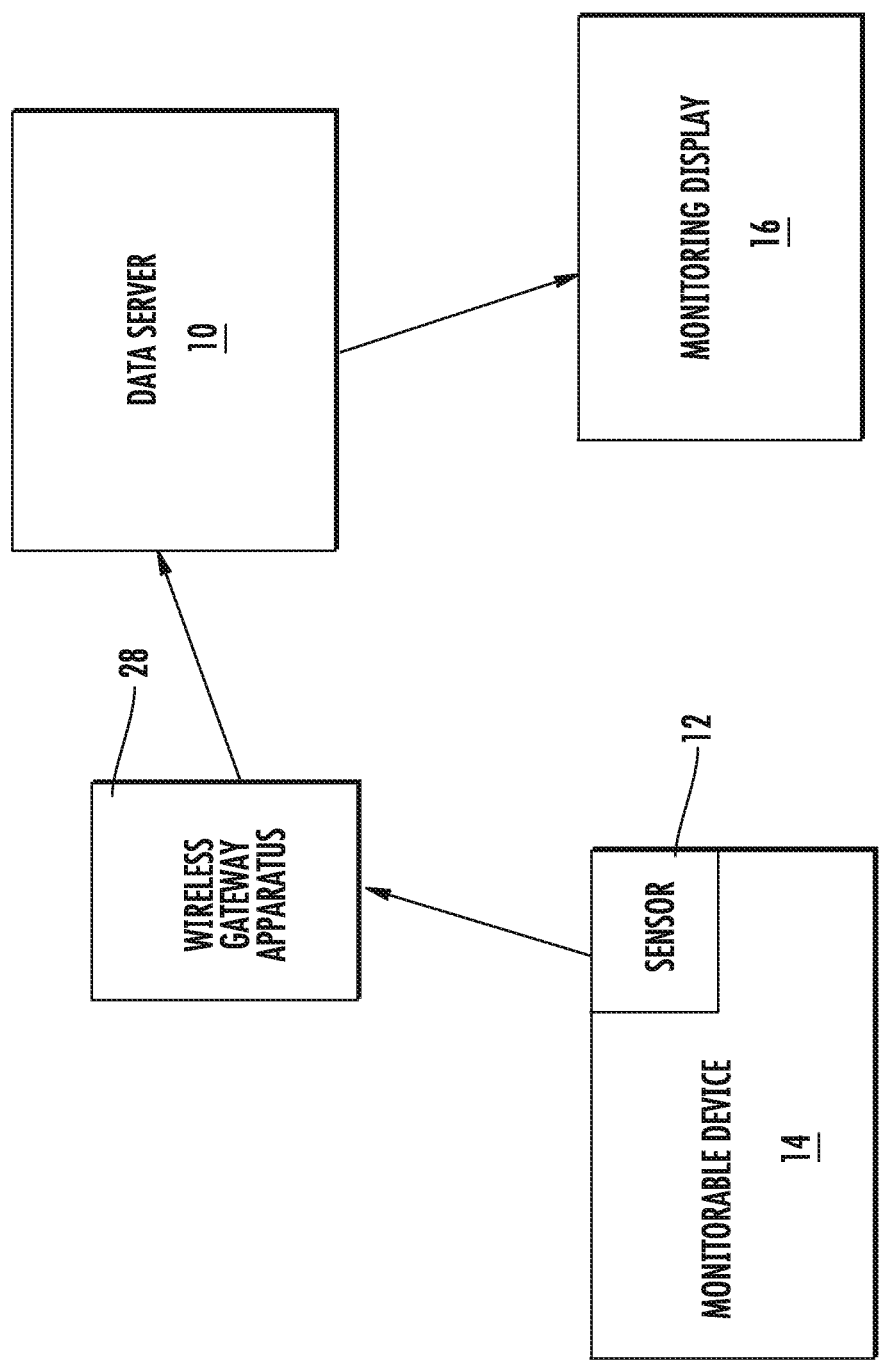
FIG. 5 is a block diagram of the system components according to a further embodiment of the disclosure which includes a wireless gateway apparatus.

Data server 10 is further configured to process data by executing system software in the form of computer readable code. Data server 10 includes memory 22 which may include a storage component which may be any suitable conventional storage means such as a hard disk drive, flash drive, or the like. In certain embodiments, the storage component may be located on a virtual computer, wherein the actual hardware hosting the data and software may change over time. In certain embodiments, data server 10 and its computing components may be present within a wireless gateway apparatus 28 (as shown in FIG. 5 and described below). In other embodiments, the data server 10 and its computing components may be present within a computer such as a laptop, or within a wireless handheld mobile device such as a cell phone or tablet. In these cases, a separate data server 10 is not necessary but is built into, or unitary with, such a gateway apparatus 28 or mobile phone or computer.

According to the present disclosure, system software stored in memory 22 may include device status determination code 26, which is computer readable code that is executable by processor 20 of data server 10, or by other suitable components of the device monitoring system. In certain embodiments, the system software may be executed by wireless gateway apparatus 28, as described below. In other embodiments, the system software may be executed by other devices with computing abilities, such as a base station computer or laptop running software thereon, wireless mobile devices running software thereon, and the like.

The computer readable code includes a rules engine module configured to apply at least one user-defined rule to the present value of the pre-selected parameter of monitorable device 14. A user with permission to access the rules engine module may enter any desired parameters to be detected or monitored into the appropriate fields of the system software. The user may define specific rules for the monitoring of these pre-selected parameters and their values. The rules engine module is configured to determine whether the at least one user-defined rule has or has not been met by monitorable device 14. For example, the user may define a rule such that when the temperature of certain equipment falls below 32° F., the rule reflects an undesirable result.

FIG. 3 is a flow diagram illustrating an exemplary process of the present disclosure. According to FIG. 3, an indication, i.e., a sensor report, is received from sensor 12 (Block S310), where the indication includes a report from sensor 12 indicating that a certain value of a readiness parameter has been sensed or detected (Block S320). The system software checks to determine whether the present value of the readiness parameter has changed (Block S330). If the present value of the readiness parameter has changed (yes), an alert may be triggered (Block S340) and the rules-engine determines if the changed present value meets the user-defined rule (Block S350) and also determines whether the changed present value of the readiness parameter triggers a response based on a user-defined rule (e.g., air pressure level below a certain PSI level). If not, the rules engine moves on and looks for more rules to check (Block S360). If yes, device status is provided (Block S370) and, in some embodiments, displayed on a monitoring display, to be viewed by a user.

The computer readable code may be executed by processor 20 to provide a data report, such as a monitorable device status report which indicates whether the at least one user-defined rule has or has not been met by monitorable device 14. In certain embodiments, the device status report indicates that at least one user-defined rule has been met. For example, the device status report may indicate whether a battery of a first responder vehicle, such as a fire truck, or fire engine (i.e., "fire apparatus") or radio battery, etc., is fully charged. In other embodiments, the device status report indicates that at least one user-defined rule has not been met. For instance, the device status report may indicate that a SCBA air level is low, based on the rule parameters entered into the rules engine module. Device status reports may include data reports relating to one or more sensors 12 as described above, and may relate to one or more parameters of one or more monitorable devices 14. Thus, certain device status reports may provide a single value level of a single monitorable device 14. Other device status reports may provide a multitude of value levels from multiple monitorable devices 14. Such device status reports may be provided any suitable format, such as a bar graph, line graph, pie chart, spreadsheet, or the like. The device status reports may be alphanumeric. Such data reports may be stored in data server 10, and are preferably remotely accessible via a wireless network or system.

In one embodiment, information may be sent from data center 10 to one or more monitoring displays 16. The monitoring displays 16 are capable of wired or wireless communication with data server 10. The monitoring display 16 may include a wireless transmitter and/or transceiver to provide communication with data center 10 or other devices. Monitoring display may 16 may be any suitable device which is capable of displaying data of the data server 10. Examples of suitable monitoring displays nonexclusively include a television display, a personal computer or laptop, or a wireless mobile device such as a cell phone or tablet. In certain embodiments of the disclosure, a local monitoring display 16 such as a television display is present on site at a fire station or the like, and one or more additional monitoring displays 16 such as wireless mobile devices may be used to remotely access the data of the data server 10. Such remote monitoring displays 16 allow for a user to remotely monitor the status of monitorable devices 14, such as in a fire station or police station or the like. Thus, those present on site may monitor the television display while those not on site may monitor such station data remotely by commissioning their wireless mobile devices as additional monitoring displays 16. Preferably, the monitoring display 16 or displays are capable of displaying device status reports which correspond to real-time values of the at least one monitorable device 14, as detected by at least one sensor 12 and processed by the data server 10.

The device monitoring system may be configured to provide audio and/or visual alerts which correspond to the device status reports, and indicate that at least one user-defined rule has either been met or not bet by monitorable device 14. Such alerts preferably originate from the rules engine of the data server 10 and are sent from the data server 10 to the monitoring display 16 via a wireless network, wireless Internet connection, or the like. The alert may alternatively be sent using a proprietary TYCO® wireless protocol between the data server 10 and the monitoring display 16. The alerts are intended to gain the attention of the appropriate personnel, who are then notified that one or more monitorable devices 14 may need attention. In certain embodiments, a positive alert may indicate that at least one user-defined rule has been met, or a pre-set value has achieved or surpassed a desired level. A positive alert may comprise an audio and/or visual notification, which may be as simple as a sound or a light emitting diode (LED) light indicating a positive status message such as "tank full" or "battery charged," or a colored LED light such as a green light to indicate a positive status message. In certain embodiments, an alert may indicate that at least one user-defined rule has not been met, or a pre-set value has fallen below a desired level. Examples of such alerts nonexclusively include low temperature warnings, freeze warnings, low water warnings, low fuel warnings, low battery warnings, low air pressure warnings, low oxygen warnings, and loss of network connection, among others. The alert may comprise an audio and/or visual notification, which may be as simple as a sound or an LED light indicating a negative status message such as "tank empty" or "battery low," or a colored LED light such as a yellow or red light to indicate a negative status message. In certain embodiments, the alert may comprise an email, text, or short message service (SMS) message which corresponds to a device status report.

Figure 4:
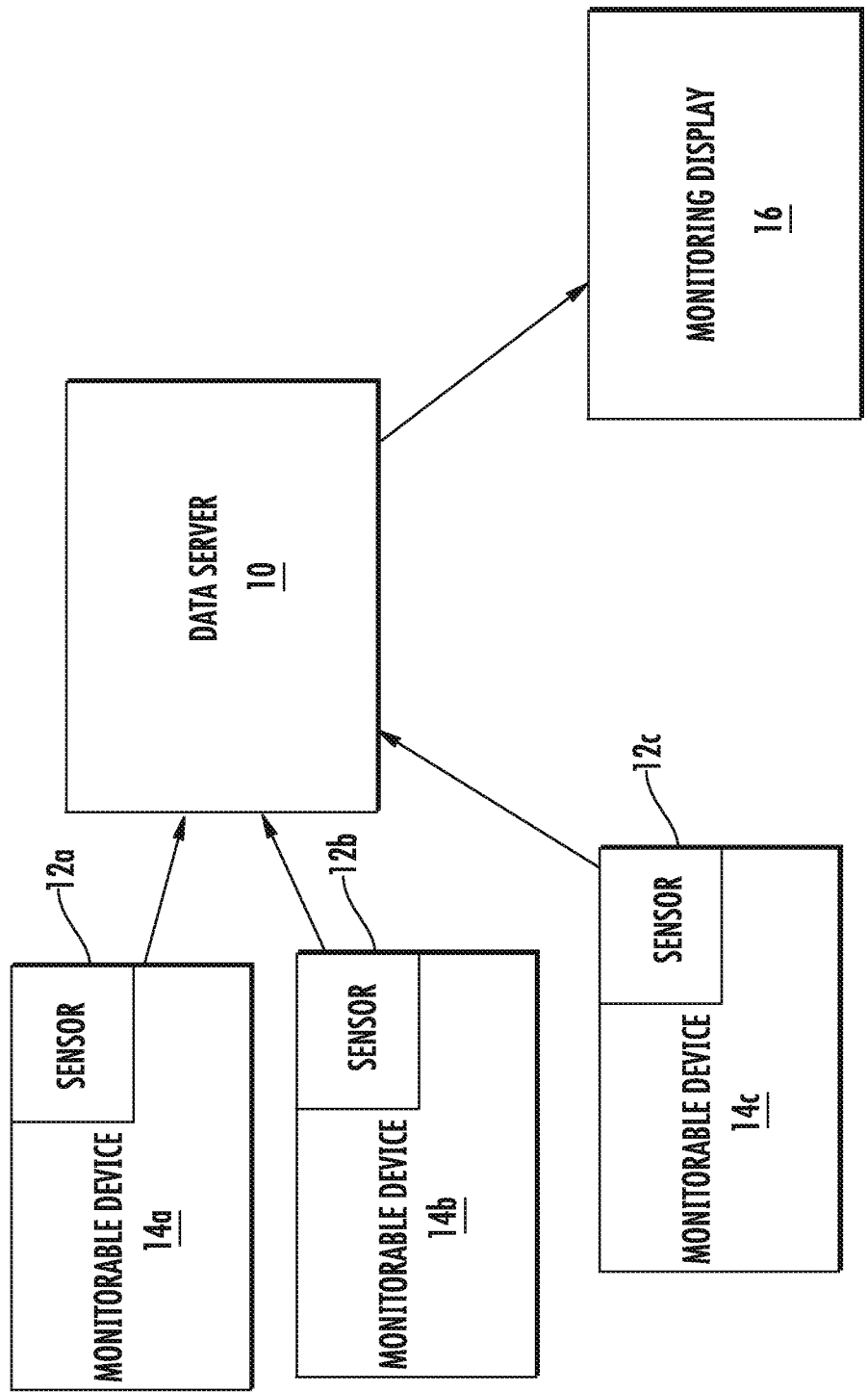
FIG. 4 is a block diagram of the system components according to a further embodiment of the disclosure which includes multiple monitorable devices.

As discussed above, more than one monitoring device 14, each having a corresponding sensor 12, may transmit data to data server 10, as shown in FIG. 4. In FIG. 4, monitoring devices 14a, 14b, and 14c (collectively referred to as "monitoring device 14") are shown, although it is within the scope of the present disclosure to include any number of monitoring devices 14, each having a corresponding sensor 12a, 12b and 12c (collectively referred to as "sensor 12"). In one embodiment, a single sensor 12 may monitor more than one monitorable device 14.

Figure 6:
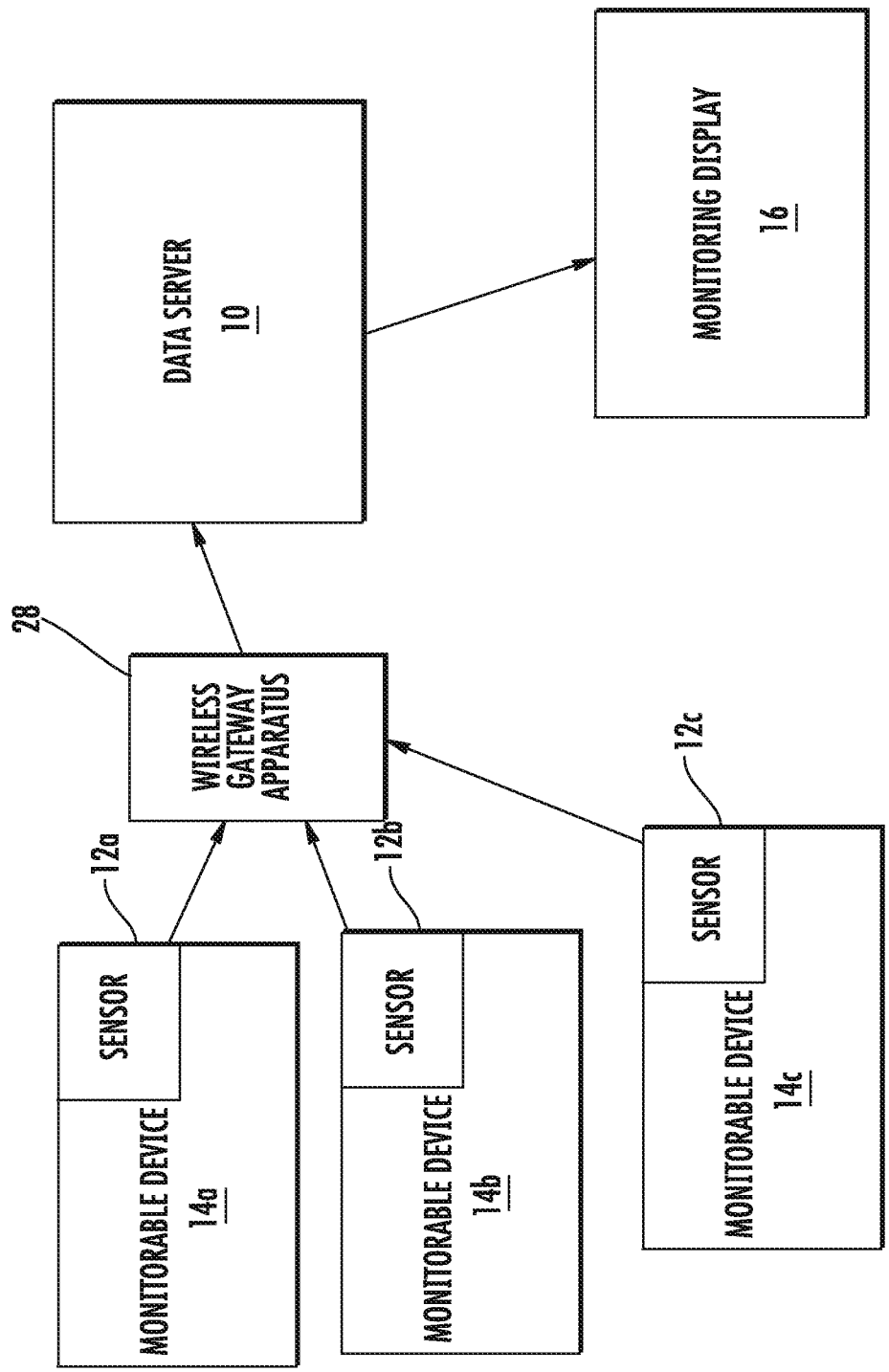
FIG. 6 is a block diagram of the system components according to a further embodiment of the disclosure which includes a wireless gateway apparatus and multiple monitorable devices.

In a further embodiment of the disclosure, the disclosed device monitoring system includes a communications command gateway, such as wireless gateway apparatus 28, as depicted in FIGS. 5 and 6. Gateway apparatus 28 is an apparatus which is capable of communicating with local wireless sensors via a technology such as Wi-Fi or Zigbee®, Bluetooth®, or other local networking protocol. Gateway apparatus 28 serves to transmit information between the sensors 12 and other components of the system using a networking technology such as Ethernet or cellular networks, or the like. Gateway apparatus 28 may include a microprocessor and/or storage component such as flash or a hard drive. Optionally gateway apparatus 28 may act as the data server 10 and contain the system software and rules engine module itself in addition to or in lieu of data server 10. In certain embodiments, gateway apparatus 28 serves to increase the strength of wireless signals transmitted from the at least one sensor 12 to data server 10. In these embodiments, the gateway apparatus 28 may be capable of wireless communication with the at least one sensor 12 and data server 10, and the wireless gateway apparatus is so configured to transmit the wireless data transmission from the at least one wireless sensor to the data server. In certain embodiments, the gateway apparatus 28 serves to receive data transmissions from the at least one sensor 12 and process the data transmissions itself, rather than via data server 10.

In some embodiments, gateway apparatus 28 wirelessly transmits the processed data to data server 12, or otherwise uploads such processed data to the data server 10. In some embodiments, gateway apparatus 28 may include a stand-alone wireless transceiver including a memory component, a storage component, and a processor, such that gateway apparatus 28 is capable of processing data, storing data, and executing computer readable code. The memory component may comprise any suitable memory such as a RAM (random access memory) component, a flash memory component, or the like. The storage component may comprise any suitable conventional storage means such as a hard disk drive, flash drive, or the like. The processor may comprise a microprocessor or any conventional processing component suitable for processing data received by wireless gateway apparatus 28. In certain embodiments, gateway apparatus 28 includes a proprietary TYCO® gateway device, such as the TycoOn™ proprietary gateway.

In practice, the present disclosure provides a method for monitoring a device 14, which includes a first step of providing a device monitoring system as described above. The method further includes detecting a present value of a pre-selected readiness parameter of the monitorable device 14 described above, via sensor 12 described above. A desired parameter of a monitorable device 14 is selected, and entered into the rules engine by a user, via the system software as described above. The sensor 12 detects a present value of a pre-selected readiness parameter of monitorable device 14. The present value may be any suitable parameter as selected by a user as described above, such as temperature in degrees, pressure in pounds per square inch (PSI), fluid level, or the like.

The methods described herein further includes transmitting a data transmission corresponding the present value of a pre-selected readiness parameter of monitorable device 14 to data server 10, as described above. In one embodiment, the data transmission may be made on any suitable wireless network as described above. The method further includes receiving and processing the data via the data server 10, by executing computer readable code comprising a rules engine module configured to apply at least one user-defined rule to the present value of the pre-selected readiness parameter of the monitorable device 14 and determining whether the at least one user-defined rule has or has not been met by monitorable device 14 via the rules engine.

The methods described herein further include providing a device status report which indicates whether the at least one user-defined rule has or has not been met by monitorable device 14 via the computer readable code. The device status report may be in any suitable format as described above, such as in alphanumeric form, chart form, spreadsheet form, or the like. The methods describe herein further include displaying the device status report via the monitoring display 16 described above. Suitable monitoring displays 16 are described above, and multiple monitoring displays 16 may be used simultaneously.

The methods described herein include providing an alert which indicates that the at least one user-defined rule either has been met or has not been met by monitorable device 14. As stated above, the alert may be an audio, tactile, and/or visual alert, which can be in any suitable format such as a light and/or a sound, or a transmitted message such as an email, text, or SMS message.

The disclosed system is capable of continuously monitoring the readiness status of certain devices, such as emergency equipment at a police or fire station. The system provides a means for emergency personnel, on or off site, to monitor the ready state of such equipment. The system provides real-time alerts when equipment leaves its ready state between uses or inspections. A user, whether remote or present on-site, may be alerted to the fact that one or devices has left a ready state. A user then logs on or otherwise views a corresponding device status report via a monitor in the fire station and/or via a mobile device app or the like. Based on the device status report, the user is notified that action is required to bring said device back to a ready state.

Figure 7:
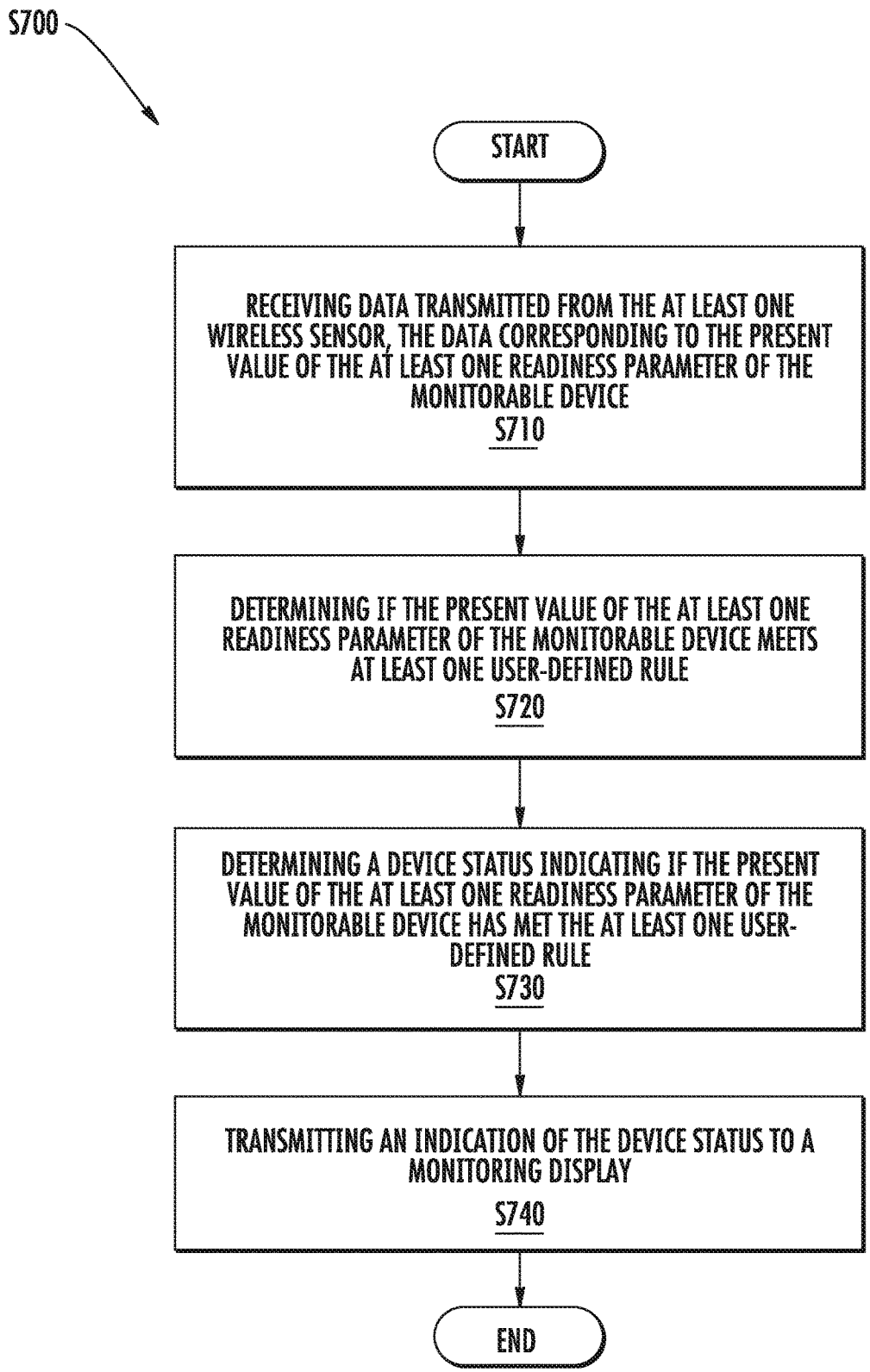
FIG. 7 is a flow chart of an alternate exemplary process for monitoring at least one readiness parameter of a monitorable device according to one embodiment of the disclosure.

FIG. 7 is a flow diagram illustrating an exemplary method S700 in accordance with the present disclosure. Method S700, in first responder readiness data server such as data server 10, is for monitoring at least one readiness parameter of a monitorable device 14 obtainable from at least one sensor 12 couplable to the monitorable device 14, the at least one sensor 12 configured to detect a present value of the at least one readiness parameter of the monitorable device 14. In one embodiment, method S700 includes receiving data transmitted from the at least one sensor 12, the data corresponding to the present value of the at least one readiness parameter of the monitorable device 14 (Block S710), determining if the present value of the at least one readiness parameter of the monitorable device 14 meets at least one user-defined rule (Block S720), determining a device status indicating if the present value of the at least one readiness parameter of the monitorable device 14 has met the at least one user-defined rule (Block S730), and transmitting an indication of the device status to a monitoring display 16 (Block S740).

The following non-limiting examples serve to illustrate the present disclosure. It will be appreciated that variations in proportions and alternatives in elements of the components of the disclosure will be apparent to those skilled in the art and are within the scope of the present disclosure.

EXAMPLES

The following sensor table and sensor rules apply to the Examples of this disclosure.

TABLE 1

Sensor Information Table

| Sensor ID | Sensor Label | Sensor Address | Present Value | Rule State ID |
|---|---|---|---|---|
| 1 | Engine 1 Water Level | 1.100 | 85 (gal) | 2 |
| 2 | Engine 1 Officer SCBA | 1.101 | 95 (psi) | 4 |
| 3 | Engine 1 Backup SCBA 1 | 1.102 | 97 (psi) | 7 |
| 4 | Engine 1 Backup SCBA 2 | 1.103 | 80 (psi) | 10 |
| 5 | Irons present | 1.104 | TRUE | 14 |

TABLE 2

Sensor Rules Table

| State ID | Sensor ID | Rule Type | Value | Icon | Sound Alert | Remote Alert |
|---|---|---|---|---|---|---|
| 1 | 1 | > | 90 | Green | OFF | NONE |
| 2 | 1 | < | 91 | Yellow | ON | Officer Group |

TABLE 2-continued

Sensor Rules Table

| State ID | Sensor ID | Rule Type | Value | Icon | Sound Alert | Remote Alert |
|---|---|---|---|---|---|---|
| 3 | 1 | < | 50 | Red | ON | ALL Groups |
| 4 | 2 | > | 90 | FULL SCBA | OFF | NONE |
| 5 | 3 | < | 91 | LOW SCBA | ON | Officer Group |

Example 1

A fire engine water tank is provided with a wireless sensor which is coupled to the water tank, such that the sensor is capable of detecting a present value of the water level within the tank. The wireless sensor periodically detects a present value of the water level, and wirelessly transmits said data to a data server in wireless communication therewith. The data server executes computer readable code comprising a rules engine module configured to apply a user-defined rule to the present value of the water level of the fire engine. According to Rule 1 of the sensor table and sensor rules, when a present value of the water level is above 90 gallons, the programmed user-defined rule is met, and a corresponding device status report is generated via the computer readable code such as device status determination code 26. The results are then displayed on a television display in the station and any other remotely connected monitoring displays, which then show a green colored icon indicating that the water level status is acceptable according to Rule 1. No warning alerts are sent.

Example 2

A fire engine water tank is provided with a wireless sensor which is coupled to the water tank, such that the sensor is capable of detecting a present value of the water level within the tank. The wireless sensor periodically detects a present value of the water level, and wirelessly transmits said data to a data server in wireless communication therewith. The data server executes computer readable code comprising a rules engine module configured to apply a user-defined rule to the present value of the water level of the fire engine. According to Rule 2 of the sensor table and sensor rules, when a present value of the water level is below 91 gallons, the programmed user-defined rule is not met, and a corresponding device status report is generated via the computer readable code such as device status determination code 26. The results are then displayed on a television display in the station and any other remotely connected monitoring displays, which then show a yellow colored icon indicating that a low water level status has been found. A sound alert is submitted to selected officers of a pre-chosen contact group, so that the situation can be remedied.

Example 3

A fire engine water tank is provided with a wireless sensor which is coupled to the water tank, such that the sensor is capable of detecting a present value of the water level within the tank. The wireless sensor periodically detects a present value of the water level, and wirelessly transmits said data to a data server in wireless communication therewith. The data server executes computer readable code comprising a rules engine module configured to apply a user-defined rule to the present value of the water level of the fire engine. According to Rule 3 of the sensor table and sensor rules, when a present value of the water level is below 50 gallons, the programmed user-defined rule is not met, and a corresponding device status report is generated via the computer readable code such as device status determination code 26. The results are then displayed on a television display in the station and any other remotely connected monitoring displays, which then show a red colored icon indicating that a low water level status has been found. A sound alert is submitted to all members of a pre-chosen contact group, so that the situation can be remedied.

Example 4

A fire station officer's SCBA (self-contained breathing apparatus) is provided with a wireless sensor which is coupled to the apparatus, such that the sensor is capable of detecting a present value of the oxygen level within the apparatus. The wireless sensor periodically detects a present value of the oxygen level, and wirelessly transmits said data to a data server in wireless communication therewith. The data server 10 executes computer readable code such as device status determination code 26 comprising a rules engine module configured to apply a user-defined rule to the present value of the oxygen level of the SCBA. According to Rule 4 of the sensor table and sensor rules, when a present value of the oxygen level is above 90 psi, the programmed user-defined rule is met, and a corresponding device status report is generated via the computer readable code. The results are then displayed on a television display in the station and any other remotely connected monitoring displays, which then show a "FULL SCBA" icon, indicating that the oxygen level of that SCBA unit is acceptable according to Rule 4. No warning alerts are sent.

Example 5

A fire station officer's SCBA (self-contained breathing apparatus) is provided with a wireless sensor which is coupled to the apparatus, such that the sensor is capable of detecting a present value of the oxygen level within the apparatus. The wireless sensor periodically detects a present value of the oxygen level, and wirelessly transmits said data to a data server in wireless communication therewith. The data server executes computer readable code comprising a rules engine module configured to apply a user-defined rule to the present value of the oxygen level of the SCBA. According to Rule 5 of the sensor table and sensor rules, when a present value of the oxygen level is below 91 psi, the programmed user-defined rule is met, and a corresponding device status report is generated via the computer readable code such as device status determination code 26. The results are then displayed on a television display in the station and any other remotely connected monitoring displays, which then show a "LOW SCBA" icon indicating that a low oxygen level status exists for that SCBA unit. A sound alert is submitted to selected officers of a pre-chosen contact group, so that the situation can be remedied.

Some example embodiments include:
1. A device monitoring system, comprising:
a) at least one wireless sensor coupled to a monitorable device, which at least one wireless sensor is configured to detect a present value of a pre-selected parameter of said monitorable device, and which at least one wireless sensor is capable of generating a wireless data transmission corresponding to the present value of the pre-selected parameter of said monitorable device;

b) a data server capable of wireless communication with the at least one wireless sensor, which data server is configured to receive data transmitted from the at least one wireless sensor, and which data server is configured to process said data by executing computer readable code comprising a rules engine module configured to apply at least one user-defined rule to the present value of the pre-selected parameter of said monitorable device, and which rules engine module is configured to determine whether the at least one user-defined rule has or has not been met by said monitorable device, and which computer readable code is configured to provide a device status report which indicates whether the at least one user-defined rule has or has not been met by said monitorable device; and c) a monitoring display capable of wired or wireless communication with said data server, which monitoring display is capable of displaying data of the data server.

2. The device monitoring system of embodiment 1, wherein the at least one wireless sensor is capable of detecting a change in the present value of the pre-selected parameter of said monitorable device as compared to a previously detected value.

3. The device monitoring system of embodiment 1, further comprising a wireless gateway apparatus capable of wireless communication with the at least one wireless sensor and the data server, which wireless gateway apparatus is configured to transmit the wireless data transmission from the at least one wireless sensor to the data server.

4. The device monitoring system of embodiment 1, wherein the monitoring display comprises a personal computer or laptop.

5. The device monitoring system of embodiment 1, wherein the monitoring display comprises a wireless mobile device.

6. The device monitoring system of embodiment 1, wherein the data server is remotely accessible via a wireless network or system.

7. The device monitoring system of embodiment 1 wherein the data server is remotely accessible via a secure web portal or mobile device application.

8. The device monitoring system of embodiment 1, wherein the data server comprises a cloud-based data server.

9. The device monitoring system of embodiment 1, which comprises a plurality of wireless sensors, each being capable of detecting the present value of a pre-selected parameter of a separate monitorable device.

10. A device monitoring system, comprising:

a) at least one wireless sensor coupled to monitorable device, which at least one wireless sensor is configured to detect a present value of a pre-selected parameter of said monitorable device, and which at least one wireless sensor is capable of generating wireless data transmissions corresponding to the present value of the pre-selected parameter of said monitorable device;

b) a wireless gateway apparatus capable of wireless communication with the at least one wireless sensor, which wireless gateway apparatus is configured to receive data transmitted from the at least one wireless sensor, and which wireless gateway apparatus is configured to process said data by executing computer readable code comprising a rules engine module configured to apply at least one user-defined rule to the present value of the pre-selected parameter of said monitorable device, which rules engine module is configured to determine whether the at least one user-defined rule has or has not been met by said monitorable device, which computer readable code is configured to provide a device status report which indicates whether the at least one user-defined rule has or has not been met by said monitorable device;

c) a data server capable of wireless communication with the wireless gateway apparatus, which data server is configured to receive data wirelessly transmitted from said wireless gateway apparatus; and d) a monitoring display capable of wired or wireless communication with said data server, which monitoring display is capable of displaying data from the data server.

11. The device monitoring system of embodiment 10, wherein the wireless gateway apparatus comprises a stand-alone wireless transceiver comprising a memory component, a storage component, and a microprocessor.

12. The device monitoring system of embodiment 10, wherein the data server comprises a cloud-based data server.

13. A method for monitoring a device, which comprises:

I) providing a device monitoring system comprising:

a) at least one wireless sensor coupled to monitorable device, which at least one wireless sensor is configured to detect a present value of a pre-selected parameter of said monitorable device, and which at least one wireless sensor is capable of generating a wireless data transmission corresponding to the present value of the pre-selected parameter of said monitorable device;

b) a data server capable of wireless communication with the at least one wireless sensor, which data server is configured to receive data transmitted from the at least one wireless sensor, and which data server is configured to process said data by executing computer readable code comprising a rules engine module configured to apply at least one user-defined rule to the present value of the pre-selected parameter of said monitorable device, and which rules engine module is configured to determine whether the at least one user-defined rule has or has not been met by said monitorable device, and which computer readable code is configured to provide a device status report which indicates whether the at least one user-defined rule has or has not been met by said monitorable device; and c) a monitoring display capable of wired or wireless communication with said data server, which monitoring display is capable of displaying data from the data server;

II) detecting a present value of a pre-selected parameter of said monitorable device, via the wireless sensor;

III) transmitting a wireless data transmission corresponding said present value of a pre-selected parameter of said monitorable device to the data server;

IV) receiving and processing said data via the data server, by executing computer readable code comprising a rules engine module configured to apply at least one user-defined rule to the present value of the pre-selected parameter of said monitorable device and determining whether the at least one user-defined rule has or has not been met by said monitorable device via the rules engine;

V) providing a device status report which indicates whether the at least one user-defined rule has or has not been met by said monitorable device via the computer readable code; and VI) displaying the device status report via the monitoring display.

14. The method of embodiment 13, comprising the further step of providing an alert which indicates that the at least one user-defined rule either has been met or has not been met by said monitorable device.

15. The method of embodiment 14, wherein the alert comprises an audio and/or visual alert.

16. The method of embodiment 15, wherein the alert comprises an email, text, or SMS message.

17. The method of embodiment 13, wherein the data server is remotely accessible via a wireless network or system.

18. The method of embodiment 13, wherein the data server is remotely accessible via a secure web portal or mobile device application.

19. The method of embodiment 13, wherein the data server comprises a cloud-based data server.

20. The method of embodiment 13, wherein the device monitoring system comprises a plurality of wireless sensors, each being capable of detecting the present value of a pre-selected parameter of a separate monitorable device.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special-purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first responder readiness data server for continuously monitoring at least one readiness parameter of a monitorable device, the at least one readiness parameter being associated with a ready state of the monitorable device for emergency response purposes at least before a commencement of an emergency, the at least one readiness parameter being obtainable from at least one sensor couplable to the monitorable device, the at least one sensor configured to detect a present value of the at least one readiness parameter of the monitorable device, the server comprising:
 a communication interface configured to continuously receive data transmitted from the at least one sensor, the data corresponding to the present value of the at least one readiness parameter of the monitorable device; and
 processing circuitry including a memory and a processor, the memory in communication with the processor, the memory having instructions that, when executed by the processor, configure the processor to:
  continuously determine if the present value of the at least one readiness parameter of the monitorable device meets at least one user-defined rule based at least in part on a sensor information table and a sensor rules table, the sensor information table including at least one sensor identifier corresponding to the at least one readiness parameter, the present value of the at least one readiness parameter corresponding to the at least one sensor identifier, and at least one rule state identifier corresponding to the at least one sensor identifier, the sensor rules table including the at least one rule state identifier corresponding to the at least one user-defined rule and the at least one sensor identifier corresponding to the at least one rule state identifier; and continuously determine a device status indicating if the present value of the at least one readiness parameter of the monitorable device has met the at least one user-defined rule; and the communication interface further configured to continuously transmit an indication of the device status to a monitoring display.

2. The first responder readiness data server of claim 1, wherein the at least one sensor is configured to detect a change in the present value of the at least one readiness parameter of the monitorable device as compared to a previously detected value.

3. The first responder readiness data server of claim 2, wherein the communication interface is further configured to:

receive an indication from the at least one sensor that the present value of the at least one readiness parameter has changed as compared to a previously detected value; and the processor is further configured to generate an alert based on the received indication, the alert indicating at least one of the at least one user-defined rule has been met, the at least one readiness parameter has fallen below a desired level, the monitorable device is in a ready state for emergency response purposes, the monitorable device has left the ready state, and the monitorable device is about to fall out of the ready state.

4. The first responder readiness data server of claim 1, wherein the monitoring display is one of a personal computer, a laptop, and a wireless mobile device.

5. The first responder readiness data server of claim 1, wherein the first responder readiness data server is remotely accessible via a wireless network.

6. The first responder readiness data server of claim 1 wherein the first responder readiness data server is remotely accessible via one of a secure web portal and mobile device application.

7. The first responder readiness data server of claim 1, wherein the first responder readiness data server is a cloud-based data server.

8. The first responder readiness data server of claim 1, wherein the readiness parameter is one of oxygen level, air pressure level, battery charge level, battery voltage level, battery life remaining, landline connection, network connection, fuel level, water level, and temperature level.

9. The first responder readiness data server of claim 1, wherein the monitorable device is one of an air pack, a gas mask, a self-contained breathing apparatus (SCBA) tank, a battery, and a fuel tank.

10. The first responder readiness server of claim 1, wherein the data corresponding to the present value of the at least one readiness parameter of the monitorable device is received from a gateway apparatus, the gateway apparatus receiving the data from the at least one sensor.

11. A first responder readiness data server for continuously monitoring at least one readiness parameter of a monitorable device, the at least one readiness parameter being associated with a ready state of the monitorable device for emergency response purposes at least before a commencement of an emergency, the at least one readiness parameter being obtainable from a plurality of sensors couplable to the monitorable device, the plurality of sensors each configured to detect a present value of the at least one readiness parameter of a corresponding monitorable device, the server comprising:

a communication interface configured to continuously receive data transmitted from the plurality sensors, the data corresponding to the present value of the at least one readiness parameter for each of the plurality of monitorable devices; and processing circuitry including a memory and a processor, the memory in communication with the processor, the memory having instructions that, when executed by the processor, configure the processor to:

continuously determine that the present value of the at least one readiness parameter of at least one of the plurality of monitorable devices has changed as compared to a previously detected value;

continuously determine that the changed present value of the at least one readiness parameter meets at least one user-defined rule based at least in part on a sensor information table and a sensor rules table, the sensor information table including at least one sensor identifier corresponding to the at least one readiness parameter, the present value of the at least one readiness parameter corresponding to the at least one sensor identifier, and at least one rule state identifier corresponding to the at least one sensor identifier, the sensor rules table including the at least one rule state identifier corresponding to the at least one user-defined rule and the at least one sensor identifier corresponding to the at least one rule state identifier; and generate an alert, the alert continuously indicating at least one of the at least one user-defined rule has been met by the changed present value of the at least one readiness parameter, the changed present value of the at least one readiness parameter has fallen below a desired level, the at least one of the plurality of monitorable devices corresponding to the changed present value of the at least one readiness parameter is in a ready state for emergency response purposes, the at least one of the plurality of monitorable devices corresponding to the changed present value of the at least one readiness parameter has left the ready state, and the at least one of the plurality of monitorable devices corresponding to the changed present value of the at least one readiness parameter is about to fall out of the ready state.

12. A method, in a first responder readiness data server, for continuously monitoring at least one readiness parameter of a monitorable device, the at least one readiness parameter being associated with a ready state of the monitorable device for emergency response purposes at least before a commencement of an emergency, the at least one readiness parameter being obtainable from at least one sensor couplable to a monitorable device, the at least one sensor configured to detect a present value of the at least one readiness parameter of the monitorable device, the method comprising:

continuously receiving data transmitted from the at least one sensor, the data corresponding to the present value of the at least one readiness parameter of the monitorable device;

continuously determining if the present value of the at least one readiness parameter of the monitorable device meets at least one user-defined rule;

continuously determining a device status indicating if the present value of the at least one readiness parameter of the monitorable device has met the at least one user-defined rule based at least in part on a sensor information table and a sensor rules table, the sensor information table including at least one sensor identifier corresponding to the at least one readiness parameter, the present value of the at least one readiness parameter corresponding to the at least one sensor identifier, and at least one rule state identifier corresponding to the at least one sensor identifier, the sensor rules table including the at least one rule state identifier corresponding to the at least one user-defined rule and the at least one sensor identifier corresponding to the at least one rule state identifier; and continuously transmitting an indication of the device status to a monitoring display.

13. The method of claim 12, wherein the at least one sensor is configured to detect a change in the present value of the at least one readiness parameter of the monitorable device as compared to a previously detected value.

14. The method of claim 13, further comprising:
receiving an indication from the at least one sensor that the present value of the at least one readiness parameter has changed as compared to a previously detected value; and
generating an alert based on the received indication, the alert indicating at least one of the at least one user-defined rule has been met, the at least one readiness parameter has fallen below a desired level, the monitorable device is in a ready state for emergency response purposes, the monitorable device has left the ready state, and the monitorable device is about to fall out of the ready state.

15. The method of claim 12, wherein the monitoring display is one of a personal computer, a laptop, and a wireless mobile device.

16. The method of claim 12, wherein the first responder data server is remotely accessible via a wireless network.

17. The method of claim 12, wherein the first responder data server is remotely accessible via one of a secure web portal and mobile device application.

18. The method of claim 12, wherein the first responder data server is a cloud-based data server.

19. The method of claim 12, wherein the readiness parameter is one of oxygen level, air pressure level, battery charge level, battery voltage level, battery life remaining, landline connection, network connection, fuel level, water level, and temperature level.

20. The method of claim 12, wherein the monitorable device is one of an air pack, a gas mask, a self-contained breathing apparatus (SCBA) tank, a battery, and a fuel tank.

* * * * *

UNITED STATES PATENT AND TRADEMARK OFFICE
CERTIFICATE OF CORRECTION

PATENT NO. : 11,146,938 B2  
APPLICATION NO. : 16/088130  
DATED : October 12, 2021  
INVENTOR(S) : Farley Page 1 of 1

It is certified that error appears in the above-identified patent and that said Letters Patent is hereby corrected as shown below:

In the Claims

Column 19  
Line 47, In Claim 6, after "Claim 1" insert -- , --.  
Line 49, In Claim 6, before "mobile device application" insert -- a --.

Column 20  
Line 13 (approx.), In Claim 11, delete "the plurality sensors" and insert -- the plurality of sensors --, therefor.  
Line 15-16 (approx.), In Claim 11, delete "the plurality of monitorable devices" and insert -- plurality of monitorable devices --, therefor.

Column 22  
Line 4, In Claim 14, delete "a previously" and insert -- the previously --, therefor.  
Line 20, In Claim 17, before "mobile device application" insert -- a --.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*